United States Patent [19]

Saigan et al.

[11] Patent Number: 5,459,207
[45] Date of Patent: Oct. 17, 1995

[54] RESORCINOL RESIN ADHESIVE COMPOSITION

[75] Inventors: Yūki Saigan, Tokyo; Mitsutoshi Ogawa, Omiya, both of Japan

[73] Assignee: Oshika Shinko Co., Ltd., Tokyo, Japan

[21] Appl. No.: 247,810

[22] Filed: May 23, 1994

[30] Foreign Application Priority Data

May 24, 1993 [JP] Japan .................................. 5-142518

[51] Int. Cl.$^6$ ........................... C08L 61/12; B32B 21/08; B32B 27/42
[52] U.S. Cl. ........................... 525/480; 525/494; 428/524; 428/528
[58] Field of Search ........................... 525/494, 480; 428/524, 528

[56] References Cited

U.S. PATENT DOCUMENTS 3,926,703  12/1975  Cantor .................................. 156/124
4,257,926  3/1981  Tanimura et al. ........................ 260/3

Primary Examiner—W. Robinson H. Clark
Attorney, Agent, or Firm—Kenyon & Kenyon

[57] ABSTRACT

Disclosed are a resorcinol resin adhesive composition which comprises a resorcinol resin modified by m-aminophenol, and a process for bonding wood materials by using the same.

6 Claims, No Drawings

RESORCINOL RESIN ADHESIVE COMPOSITION

BACKGROUND OF THE INVENTION

1. Field of the Invention

This invention relates to a resorcinol resin adhesive composition and a method of adhering, more specifically, to a resorcinol resin adhesive composition and the method of adhering using the same, which are excellent in curing rate, and particularly excellent in curability under a low temperature to exhibit excellent adhesion power. Thus, even when it is used in a winter season with a low temperature, it can be cured within a short time to exhibit excellent adhesive properties, whereby a pressing time can be shortened and releasing the pressure can be effected within a short time. Further, productivities using a resorcinol resin adhesive can be improved. Therefore, it is particularly available for the uses of panel bonding such as a plywood and a lumber, or a squarebar, etc. which is required to improve productivity, rub-out of LVLs (Laminated Veneer Lumber) for structure, and wood bonding such as longitudinal seam of woods for structure.

2. Related Art Statement

A resorcinol resin adhesive has been used for bonding of wood materials, and has been used, for example, in a laminated lumber in which a lumber or a squarebar, etc. are located substantially parallel to its fiber direction with each other and bound to the thickness, width and length directions. It has an excellent adhesion strength, water resistance, durability, fire resistance, etc. so that it is available for bonding of laminated lumbers for structure, laminated lumbers for structure with a large section, laminated lumbers for exterior, etc. and for bonding of a tire cord and a rubber, etc.

As a resorcinol resin adhesive for wood bonding, there has heretofore been provided, in general, a mixed material (a paste solution) comprising a resorcinol resin, a curing agent such as paraformaldehyde and a filler such as a coconut shell flour.

However, in the said resorcinol resin adhesive, curing of the paste solution becomes slow when an atmospheric temperature and a temperature of a material to be adhered are low during a winter season, and at a temperature lower than a normal temperature, sufficient adhesive property cannot be obtained. Also, at the normal temperature of 20° to 25° C., it is necessary to cure the paste solution for a long time of 8 to 24 hours.

Since the resorcinol resin adhesive has such a drawback, it is required to install a temperature maintaining device as a preparation equipment or to effect long time pressing of 8 to 48 hours as adhesion conditions.

From such a drawback of the resorcinol resin adhesive, an adhesion process of a laminated lumber for structure generally employed is a process in which lumbers are laminated after coating an adhesive to the lumbers, pressed by a turnbuckle, etc., placed in a thermostat chamber at 30° to 50° C. for 8 to 48 hours to cure the adhesive, and then subjected to releasing pressure and curing. Since such procedures are required, productivity using the resorcinol resin adhesive is extremely bad.

Moreover, in Japanese Patent Publications No. HEI-5-2715/1993 and No. HEI-4-17139/1992, there is disclosed a method for adhering wood materials by coating a resin component comprising a resorcinol resin or a resorcinol.phenol resin and a curing agent separately on the respective surfaces of the materials to be bonded and then laminating these materials.

SUMMARY OF THE INVENTION

An object of the present invention is to overcome the problems possessed by the prior art techniques as mentioned above and to provide a resorcinol resin adhesive having rapid curing speed and good adhesive power at a low temperature whereby improving productivity when using the same.

The present invention relates to a resorcinol resin adhesive composition comprising a resorcinol resin modified by m-aminophenol.

The present invention also relates to a method of adhesion using a resorcinol resin adhesive composition comprising a resorcinol resin modified by m-aminophenol, which comprises coating the resorcinol resin adhesive and a curing agent component to the materials to be adhered separately by a two-liquid separately coating method, and adhering these materials.

DESCRIPTION OF THE PREFERRED EMBODIMENTS

The resorcinol resin adhesive composition comprising a resorcinol resin modified by m-aminophenol to be used in the present invention is a resorcinol resin using m-aminophenol as a modifier, and may include, for example, a resorcinol.formaldehyde resin such as a resorcinol.m-aminophenol.formaldehyde co-condensed resin obtained by the reaction of resorcinol, m-aminophenol and formaldehyde, and a resorcinol.phenol.m-aminophenol.formaldehyde co-condensed resin obtained by the reaction of resorcinol, phenol, m-aminophenol and formaldehyde; and a resorcinol.formaldehyde resin part of the above resins is modified by cresol, xylenol, tannin or lignin.

The molar ratio of formaldehyde to resorcinol and m-aminophenol at the reaction when the above resorcinol.m-aminophenol.formaldehyde co-condensed resin is to be obtained, and the molar ratio of formaldehyde to resorcinol, m-aminophenol and phenol at the reaction when the above resorcinol.phenol.m-aminophenol.formaldehyde co-condensed resin is to be obtained is desirably 0.4 to 0.8 mole of formaldehyde per mole of the latter mixture.

Also, the pH at the synthetic reaction is preferably adjusted to in the range of 6 to 11 by using an alkali catalyst such as NaOH.

The content of the m-aminophenol in the resorcinol resin modified by the m-aminophenol is preferably 1 to 20 parts by weight based on 100 parts of the total resin. If it is less than 1 part by weight, a curing accelerating effect of the resorcinol resin becomes insufficient, during 1 to 20 parts by weight, curing becomes rapid and if it exceeds 20 parts by weight, the curing accelerating effect is saturated and it is not economical.

Accordingly, the content of the resorcinol in the resorcinol resin modified by the m-aminophenol is preferably 15 to 30 parts by weight on 100 parts of the total resin by the some reason as above.

The resorcinol resin adhesive composition of the present invention can be obtained by adding a curing agent to the above m-aminophenol-modified resorcinol resin.

In the resorcinol resin adhesive composition of the present invention, by adding a curing agent to a resin composition in which the m-aminophenol.formaldehyde resin or the m-aminophenol.phenol.formaldehyde resin and, the resorcinol.formaldehyde resin or the resorcinol.phenol.formaldehyde resin are blended, the resorcinol resin adhesive composition comprising the m-aminophenol-modified resorcinol resin can be constituted by the reaction of the curing agent.

The resin component in the resorcinol resin adhesive composition of the present invention is preferably within the range of 50 to 70% by weight, the pH of 6 to 11, the viscosity of 2 to 100 poise/25° C. (BH type viscometer, 20 rotations).

As the curing agent, there may be used a powdery curing agent such as powdery paraformaldehyde and powdery hexamethylenetetramine; and a liquid curing agent in which powdery paraformaldehyde or a formalin aqueous solution is blended with water, a phenol resin or a dispersion such as a synthetic rubber type emulsion.

By adding the curing agent, the resin composition can be cured within a short time. Incidentally, when 10 parts by weight of paraformaldehyde as a curing agent is added to 100 parts by weight of the above adhesive resin, the composition gelled within 30 second to 10 minutes/25° C. Accordingly, it is recommended to use the method in which the adhesive resin and the curing agent are separately coated in view of the usable time. For example, there may be preferably employed the method in which the adhesive is coated on one surface while the liquid curing agent is coated on the other surface and the both coated surfaces (the surfaces to be adhered) are faced to each other to blend the both components, and the method in which the adhesive and the liquid curing agent are individually sprayed to the coating surfaces (the surfaces to be adhered) of materials to be adhered such as a wood board and blended them on the coated surfaces thereof. Particularly when blend is carried out on the surfaces, the two liquid separately coating method in which the resin component and the curing agent component are separately coated as mentioned above is preferably employed. When the curing agent is added to one or both of the resin to be blended without using the two liquid separately coating method, the usable time is markedly limited.

To the above adhesive composition, a filler such as coconut shell flour, walnut shell flour, wood flour, wheat flour, soy bean flour, calcium carbonate, zeolite and clay may be formulated.

Also, a rubber type emulsion such as SBR (styrene.butadiene rubber) and NBR (nitrile.butadiene rubber), and an aqueous polymer thickener such as a polyvinyl alcohol, methyl cellulose, polyethylene oxide, carboxymethyl cellulose and alginic acid may be formulated. Further, an alcohol such as ethanol, methanol and ethylene glycol may be formulated.

EXAMPLES

Next, the present invention will be explained by referring to Examples.

Example 1

In a three-necked flask equipped with a reflux condenser and a stirrer were charged 280 g of formalin (37%), 170 g of phenol and 100 g of water, and after adjusting the pH to 9.8 to 10.4 with NaOH, the mixture was reacted at 80° C. for one hour. Then, to the mixture were added 330 g of resorcinol and 50 g of m-aminophenol, and the mixture was reacted at 90° to 100° C. for 3 hours to obtain a resorcinol.phenol.m-aminophenol.formaldehyde co-condensed resin.

With 100 parts by weight of the resulting resin was mixed 50 parts by weight of a liquid curing agent (D-100, trade name, available from Oshika Shinko Co. Ltd., a curing agent for a resorcinol resin containing 30% formaldehyde) and a gel time thereof was measured to give the result of 40 sec/25° C. The viscosity was 10 poise/25° C.

Then, under the following operation conditions, adhesion of laminated lumbers was carried out and adhesion characteristics of the resulting material were measured according to the following test method.

(1) Operation conditions

Coating method: The above resorcinol.phenol.m-aminophenol.formaldehyde co-condensed resin was coated on one surface of a Western hemlock lumber and the above liquid curing agent was coated on one surface of another Western hemlock lumber, and the both coated surfaces were laminated.

Materials to be adhered: Western hemlock lumber with a thickness of 30 mm, water content of 8 to 10%/5° C.

Constitution: Two sheets of Western hemlock lumbers were laminated.

Coating amount: 200 g/m$^2$ of the resin component and 100 g/m$^2$ of the liquid curing agent.

Pressing: 2 hours, 5° C., 10 kg/cm$^2$.

(2) Test method

Based on Japanese Agricultural and Forestry Standard of a laminated lumber for structure, a block shear test, a dipping peel test and a boiling peel test were carried out.

The results are shown in Table 1.

Example 2

In a three-necked flask equipped with a reflux condenser and a stirrer were charged 230 g of formalin (37%), 130 g of m-aminophenol, 200 g of methanol and 130 g of water, and after adjusting the pH to 9.0 with NaOH, the mixture was reacted at 80° C. for one hour. Then, to the mixture was added dropwise 160 g of formalin (37%) over one hour, and the mixture was further reacted at 80° to 85° C. for 3 hours to obtain a m-aminophenol.formaldehyde resin.

20 parts by weight of the resulting resin was blended with 80 parts by weight of a resorcinol.phenol.formaldehyde co-condensed resin.(Oshika resin D-300, trade name, available from Oshika Shinko Co. Ltd.,).

To 100 parts by weight of the blended resin was added 50 parts by weight of the liquid curing agent used in Example 1, and a gel time thereof was measured to give the result of 70 sec/25° C. The viscosity was 60 poise/25° C.

In the same manner as in Example 1, adhesion of lumbers was carried out by coating the blended resin on one surface of a Western hemlock lumber and coating the liquid curing agent on one surface of another Western hemlock lumber, and laminating the both coated surfaces thereof. Adhesion characteristics were measured according to the same test methods as in Example 1.

The results are shown in Table 1.

Example 3

In the same manner as in Example 2 except for using 50 parts by weight of the m-aminophenol.formaldehyde resin and 50 parts by weight of the resorcinol.phenol.formaldehyde co-condensed resin, a blend resin was prepared. To 100 parts by weight of the blend resin was blended 50 parts by weight of the liquid curing agent used in Example 1, and a gel time thereof was measured to give the result of 40 sec/25° C. The viscosity was 40 poise/25° C.

In the same manner as in Example 1, adhesion of lumbers was carried out by coating the blended resin on one surface of a Western hemlock lumber and coating the liquid curing agent on one surface of another Western hemlock lumber, and laminating the both coated surfaces thereof. Adhesion characteristics were measured according to the same test methods as in Example 1.

The results are shown in Table 1.

Comparative example 1

As a resorcinol resin, the resorcinol.formaldehyde resin (Deernol No. 50, trade name, available from Oshika Shinko Co. Ltd.,) having the following characteristics was used.

Resin characteristics

Viscosity; 5 poise/25° C.

Resin component; 65%

Gel time; 120 min/25° C. (in the case of the resin/paraformaldehyde=100/10 parts by weight)

With 100 parts by weight of the above resorcinol.formaldehyde resin were blended 10 parts by weight of paraformaldehyde and 5 parts by weight of wood flour to obtain a formulated paste solution having a viscosity of 22 poise/25° C.

Then, under the following operation conditions, adhesion of lumbers for lamination was carried out and adhesion characteristics of the resulting laminated lumber were measured according to the same test method as in Example 1.
(1) Operation conditions Coating method: The above formulated paste solution was coated on one surface of a Western hemlock lumber and another Western hemlock lumber was laminated thereon.

Materials to be adhered: Western hemlock lumber with a thickness of 30 mm, water content of 8 to 10%/5° C.

Constitution: Two sheets of Western hemlock lumbers were laminated.

Coating amount: 300 g/m², one surface coating.

Pressing: 2 hours, 5° C., 10 kg/cm².

Comparative example 2

As a resorcinol resin, the resorcinol.phenol.formaldehyde resin (Deernol No. 35, trade name, available from Oshika Shinko Co. Ltd.,) having the following characteristics was used.

Resin characteristics

Viscosity; 4 poise/25° C.

Resin component; 60%

Gel time; 100 min/25° C. (in the case of the resin/paraformaldehyde=100/10 parts by weight)

With 100 parts by weight of the above resorcinol.phenol.formaldehyde resin were blended 10 parts by weight of paraformaldehyde and 5 parts by weight of wood flour to obtain a formulated paste solution having a viscosity of 20 poise/25° C.

Then, in the same manner as in Comparative example 1, adhesion of lumbers for lamination was carried out and adhesion characteristics of the resulting laminated lumber were measured according to the same test method as in Example 1.

The results are shown in Table 1.

Comparative example 3

As a resorcinol resin, the resorcinol.phenol.formaldehyde resin (Deernol No. 300, trade name, available from Oshika Shinko Co. Ltd.,) having the following characteristics was used.

Resin characteristics

Viscosity; 70 poise/25° C.

Resin component; 65%

Gel time; 70 min/25° C. (in the case of the resin/paraformaldehyde=100/10 parts by weight)

With 100 parts by weight of the above resorcinol.phenol.formaldehyde resin was blended 10 parts by weight of paraformaldehyde to obtain a formulated paste solution having a viscosity of 80 poise/25° C.

Then, in the same manner as in Comparative example 1, adhesion of lumbers for lamination was carried out and adhesion characteristics of the resulting laminated lumber were measured according to the same test method as in Example 1.

The results are shown in Table 1.

TABLE 1

| | | No. | | | | | |
|---|---|---|---|---|---|---|---|
| | | Example | | | Comparative example | | |
| Adhesion strength test | Pressing time and temperature | 1 2 hr 5° C. | 2 2 hr 5° C. | 3 2 hr 5° C. | 1 2 hr 5° C. | 2 2 hr 5° C. | 3 2 hr 5° C. |
| Block shear test (normal) | Average adhesion strength (kgf/cm²) | 101 | 95 | 103 | 0 | 0 | 0 |
| | Average wood portion breakage rate (%) | 86 | 83 | 92 | 0 | 0 | 0 |
| Dipping peel test | | Pass | Pass | Pass | Failure | Failure | Failure |
| Boiling peel test | | Pass | Pass | Pass | Failure | Failure | Failure |

Example 4

By using 100 parts by weight of the resorcinol.phenol.m-aminophenol.formaldehyde co-condensed resin obtained in Example 1 and 50 parts by weight of the liquid curing agent (D-100, trade name, available from Oshika Shinko Co. Ltd.,) used in Example 1, to obtain compounded paste, finger bonding of longitudinally seamed woods was carried out under the following operation conditions. Adhesion characteristics of the bonded portion were measured according to the following test method.
(1) Operation conditions Coating method: The resin was coated on one surface of a finger portion and the liquid curing agent was coated on one surface of another finger portion (separately coating system), and coating was carried out by using a brush.

Materials to be adhered: Japanese latch finger processed material with a water content of 8 to 10%/5° C. and a specific gravity of 0.53 to 0.57 (thickness: 20 mm, width: 150 mm, length: 500 mm)

Shape of finger: Vertical finger processed material with a length of 18 mm and a pitch of 5.5 mm Coating amount: 400 g/m² (resin: 267 g/m², liquid curing agent: 133 g/m²)

Assembly: 5° C., 5 min.

Pressing: 80 kg/cm².

Cure: 5° C., 1 hour, 3 hours, 24 hours.
(2) Test method

Based on Japanese Agricultural and Forestry Standard of a laminated lumber for structure with a large section, a bending test of a longitudinal seam wood was carried out.

The results are shown in Table 2.

Comparative example 4

By using the formulated paste solution obtained in Comparative example 2, finger bonding of longitudinally seamed woods was carried out under the following operation conditions, and adhesion characteristics of the bonded portion were measured according to the following test method.
(1) Operation conditions
Coating method: The above formulated paste solution was coated by using a brush.
Materials to be adhered: Japanese latch finger processed material with a water content of 8 to 10%/5° C. and a specific gravity of 0.53 to 0.57 (thickness: 20 mm, width: 150 mm, length: 500 mm)
Shape of finger: Vertical finger processed material with a length of 18 mm and a pitch of 5.5 mm
Coating amount: 400 g/m$^2$
Assembly: 5° C., 5 min.
Pressing: 80 kg/cm$^2$.
Cure: 5° C., 1 hour, 3 hours, 24 hours.
(2) Test method
Based on Japanese Agricultural and Forestry Standard of a laminated lumber for structure with a large section, a bending test of a longitudinal seam wood was carried out.
The results are shown in Table 2.

TABLE 2

| | | No. | | | | | |
|---|---|---|---|---|---|---|---|
| | | Example 4 | | | Comparative example 4 | | |
| | Cure time and temperature | 1 hr 5° C. | 3 hrs 5° C. | 24 hrs 5° C. | 1 hr 5° C. | 3 hrs 5° C. | 24 hrs 5° C. |
| Bending test | | | | | | | |
| Average strength | bending (kg/cm$^2$) | 261 | 430 | 530 | 151 | 186 | 313 |

According to the present invention, the adhesive has rapid curing rate, and shows particularly excellent curability under a low temperature and exhibits excellent adhesion power. Thus, even when it is used in a winter season with a low temperature, it can be cured within a short time to exhibit excellent adhesive properties, whereby a pressing time can be shortened and releasing the pressure can be effected within a short time. Further, productivities using a resorcinol resin adhesive can be improved. Therefore, it can be provided an adhesive particularly available for the uses of panel bonding such as a plywood and a lumber, or a squarebar, etc. which is required to improve productivity, rub-out of LVLs for structure, and wood bonding such as longitudinal seam of woods for structure.

What is claimed is:

1. A method of bonding wood using a resorcinol resin adhesive composition comprising:

providing a resorcinol resin composition comprising a resorcinol.m-aminophenol.formaldehyde co-condensed resin obtained by reaction of resorcinol, m-aminophenol, and formaldehyde;

bonding only wood material with said resorcinol resin adhesive composition.

2. A method of using the resorcinol resin adhesive composition according to claim 1 wherein said bonding comprises finger bonding of longitudinally seamed wood.

3. A method of bonding wood using a resorcinol resin adhesive composition comprising:

providing a resorcinol resin adhesive composition comprising a resorcinol.phenol.m-aminophenol.formaldehyde co-condensed resin obtained by reaction of resorcinol, phenol, m.aminophenol, and formaldehyde;

bonding only wood material with said resorcinol resin adhesive composition.

4. A method of using the resorcinol resin adhesive composition according to claim 2 wherein said bonding comprises finger bonding of longitudinally seamed wood.

5. An article of manufacture comprising:

a first piece of wood material;

a second piece of wood material;

a resorcinol resin adhesive composition bonding said first piece of wood material to said second piece of wood material;

said resorcinol resin adhesive composition comprising a resorcinol.m-aminophenol.formaldehyde co-condensed resin obtained by reaction of resorcinol, m-aminophenol and formaldehyde.

6. An article of manufacture comprising:

a first piece of wood material;

a second piece of wood material;

a resorcinol resin adhesive composition bonding said first piece of wood material to said second piece of wood material;

said resorcinol resin adhesive composition comprising a resorcinol.phenol.m-aminophenol.formaldehyde co-condensed resin obtained by reaction of resorcinol, phenol, m-aminophenol, and formaldehyde.

* * * * *